United States Patent [19]

Duffy

[11] Patent Number: 4,570,735
[45] Date of Patent: Feb. 18, 1986

[54] DUAL ROTARY VALVE FOR VARIABLE ASSIST POWER STEERING GEAR FOR AUTOMOTIVE VEHICLES

[75] Inventor: James J. Duffy, Livonia, Mich.

[73] Assignee: Ford Motor Company, Dearborn, Mich.

[21] Appl. No.: 663,267

[22] Filed: Oct. 22, 1984

Related U.S. Application Data

[63] Continuation-in-part of Ser. No. 430,223, Sep. 20, 1982, abandoned.

[51] Int. Cl.$^4$ ............................................... B62D 5/08
[52] U.S. Cl. ...................................... 180/142; 60/468; 91/375 A; 91/437; 137/596.12; 180/143
[58] Field of Search ....................... 180/142, 143, 141; 60/468; 91/437, 450, 375 A, 467; 137/596.12

[56] References Cited

U.S. PATENT DOCUMENTS 4,063,490 12/1977 Duffy ...................................... 91/467
4,186,818 2/1980 Jablonsky ............................... 180/133
4,189,024 2/1980 Jablonsky ............................... 180/133

Primary Examiner—John A. Pekar
Attorney, Agent, or Firm—Donald J. Harrington; Keith L. Zerschling

[57] ABSTRACT

A power steering gear mechanism for an automotive vehicle having a pressure operated vehicle steering mechanism controlled by a rotary valve with primary and secondary valve portions wherein the primary valve portion develops a fast-rising steering pressure characteristic for incremental changes in steering torque at low driving speeds and a flatter or more gradual steering pressure rise characteristic for incremental changes in steering torque at high driving speeds, the latter resulting from the action of the secondary valve portion which functions in cooperation with the primary valve portion whereby the pressure versus torque relationship is optimized for parking maneuvers, for driving maneuvers and for center-feel.

17 Claims, 10 Drawing Figures

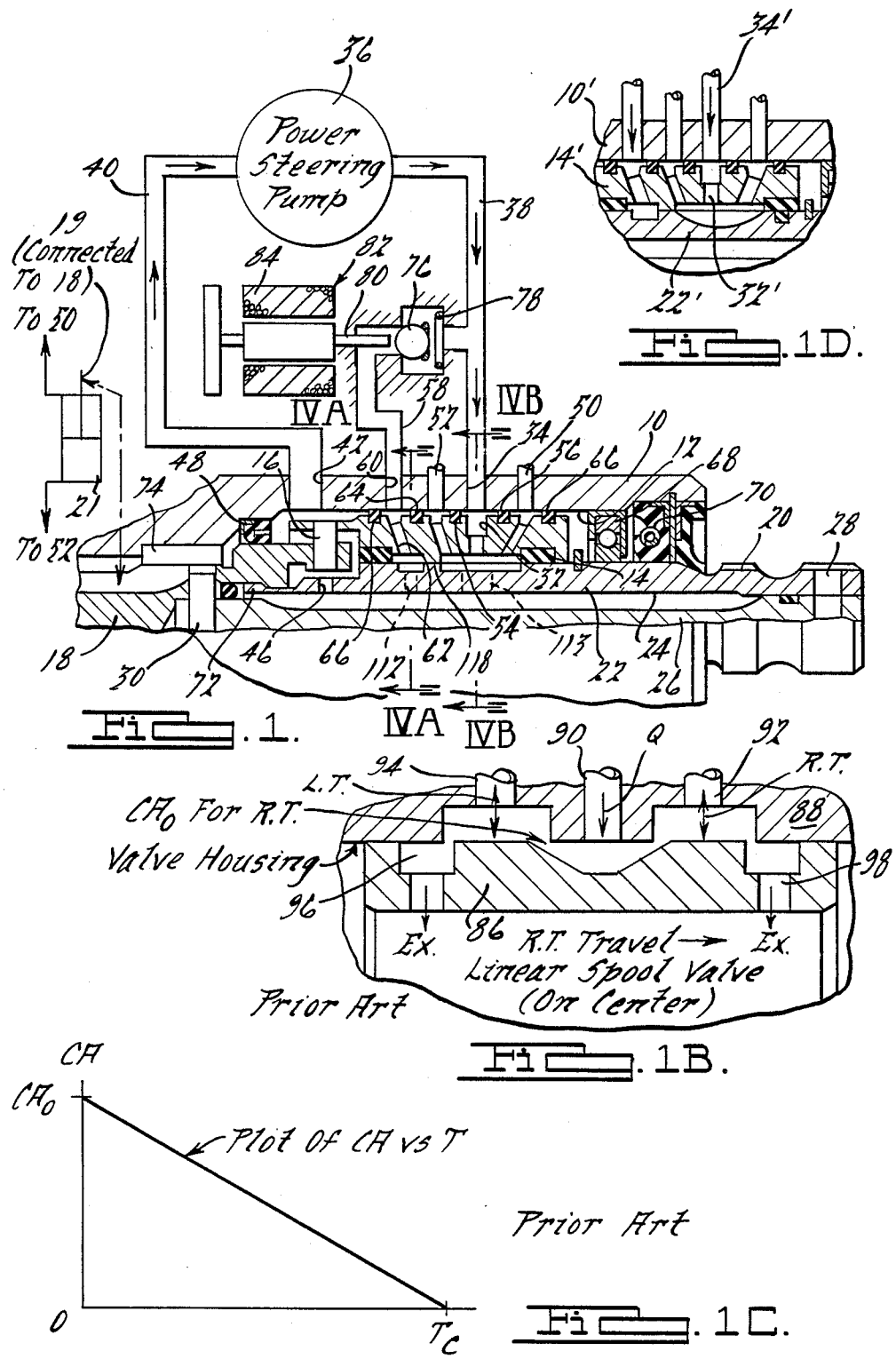

DUAL ROTARY VALVE FOR VARIABLE ASSIST POWER STEERING GEAR FOR AUTOMOTIVE VEHICLES

REFERENCE TO RELATED DISCLOSURE

This disclosure is a continuation-in-part of my conpending application Ser. No. 430,223, filed Sept. 20, 1982, entitled, "Dual Rotary Valve for Variable Assist Power Steering Gear for Automotive Vehicles", which is assigned to the assignee of this invention, now abandoned.

GENERAL DESCRIPTION OF THE INVENTION

My invention comprises a power steering mechanism for an automotive vehicle having a fluid pressure operated motor and a rotary valve controlling distribution of pressure to the pressure chambers of the fluid motor from a power steering pump. It may be adapted, for example, for a power steering gear mechanism of the kind shown in my U.S. Pat. No. 4,063,490, which is assigned to the assignee of this invention.

The structure shown in my earlier patent comprises a rack-and-pinion steering mechanism for an automotive vehicle wherein a fluid pressure operated piston is connected to a gear rack, which in turn engages a drive pinion. The pinion is connected to a driver operated steering shaft by means of a torsion bar. A rotary control valve mechanism for the rack-and-pinion steering gear mechanism controls distribution of fluid pressure from a power steering pump to the pressure chambers on opposite sides of the piston. The rotary valve mechanism comprises a valve sleeve connected operatively to the steering gear pinion, and a rotary valve element situated in the valve sleeve is connected to the steering shaft. Upon deflection of the torsion bar due to application of steering effort to the steering shaft, the inner valve element of the rotary valve mechanism is displaced angularly with respect to its valve sleeve. The torsion bar serves as a valve centering spring. This creates a pressure build-up in one pressure chamber or the other depending upon the direction of the applied torque. A chosen geometric relationship of the valve lands can be established to achieve a desired responsiveness of the steering gear mechanism. The characteristics that are desirable for low speed driving and for parking maneuvers, however, are not the same as the steering characteristics that are desirable for high speed steering maneuvers. Thus a design compromise must be made in an attempt to provide the desired steering characteristics for the vehicle throughout the entire speed range over which the vehicle is designed to operate.

The improvements of my invention comprise a valve mechanism having primary and secondary valve portions. Although the embodiment described in this specification includes a rotary valve mechanism having an inner valve element and a surrounding sleeve, my invention is adaptable also to a steering system having a valve element displaceable axially relative to a companion valve element. A power steering pump is used to supply steering pressure to the valve mechanism and a speed responsive valve is included in the system to provide a secondary pressure feed passage for the valve mechanism at higher speeds. The speed responsive valve mechanism of a preferred embodiment of my invention is a solenoid operated valve, and it is normally closed to effect at low speeds a single pressure distribution passage through the valve mechanism from the power steering pump but it provides parallel feed passages to the valve mechanism at higher speeds. A separate feed passage is provided for the primary valve portions and for the secondary valve portions.

At low speeds the solenoid valve is closed and the secondary rotary valve portions thus have no effect. The primary valve portions assume a closed, flow restricting position at a given relative displacement of the steering shaft—for example, 2 degrees; and thus the torsional resistance of the valve centering spring or torsion bar is small for any given pressure. Above a given speed, however, the solenoid valve is energized thus opening the solenoid valve; and the parallel feed passages provide fluid flow to both valve portions. The port openings in the valve structure for the secondary valve portion and the primary valve portion then are additive since the secondary valve lands close at a greater angular displacement than the primary valve lands. Since the secondary valve closes at a higher deflection of the centering spring or torsion bar—for example, 5 degrees rather than 2 degrees, the deflection and torsional resistance of the centering spring or torsion bar are greater for a given steering pressure. This provides optimum steering characteristics for both high speed driving and low speed driving as well as for steering maneuvers while parking.

Provision is made also in a preferred embodiment of my invention to prevent a shift from a heavy steering effort to a light steering effort, or visa-versa, during a steering manuver as the vehicle decelerates to a value less than 10 miles per hour. This is done by a normally open pressure switch located on the supply side of the steering gear mechanism. If during a steering maneuver pressure exceeds a precalibrated value—for example, 100 PSI, the normally open pressure switch closes thereby maintaining an open solenoid and heavy efforts result although the speed sensor switch may have opened. Undesirable changes from a light steering effort to a heavy steering effort is prevented since steering pressures of a relatively high magnitude on the solenoid valve will prevent opening of the solenoid valve even if the solenoid actuator should be triggered. Steering maneuvers during straight ahead driving when the pressure of the steering gear is approximately 50 PSI will not prevent the opening of the solenoid valve when the solenoid actuator is triggered.

In its broadest aspect my invention comprises a power steering system having a valve with relatively displaceable valve elements having primary and secondary sections. A steering torque input shaft is connected to pressure movable parts by a valve element centering spring or torsion member. The effective flow metering area or flow throttling area for the registering valve lands of the valve is the sum of the respective areas for the primary and secondary sections. A pressure buildup is made available to the fluid motor portions of the steering system as the effective flow metering area decreases upon relative displacement of the valve elements. Since the pump flow is constant and since the relative displacement of the valve elements and the flow metering area are proportional to the steering torque applied to the centering spring or torsion member, the relationship between working pressure made available to the fluid motor and steering torque can be expressed as a function of effective fluid flow area for the valve sections. The working pressure for any given pump flow is a function of flow metering area since the pump flow is regulated at a constant value. Thus, $P=K(Q/CA)^2$ where A=effective flow area, K and C are constants, Q=fluid delivery rate and P=working pressure. Since Q also is a constant, $P=K'/(CA)$ where K' is a combined constant for K and Q. Under a high speed operating mode, A is large at low torque because fluid flows through both valve sections as a speed response bypass valve is opened. At high torque, fluid flows through the secondary valve only. A transition from a high speed operating mode to a low speed operating mode takes place as the speed responsive bypass valve is closed. The effective flow metering area for any given torque then is less than the corresponding flow metering area for the high speed operating mode. Both valve sections are effective in the high speed mode and only the primary valve is effective in the low speed mode.

BRIEF DESCRIPTION OF THE FIGURES OF THE DRAWINGS

FIG. 1 shows in cross section a steering gear mechanism together with valve elements arranged in schematic form for controlling pressure distribution to the valve elements. The valve elements of the kind shown in FIG. 1 are adaptable for use in a steering gear mechanism of the kind shown in U.S. Pat. No. 4,063,490, and reference may be made to that, patent for purposes of supplementing this disclosure.

FIG. 1B is a schematic representation of a power steering valve comprising a linear valve spool together with the geometric relationships of the internal valve lands with respect to the external valve lands. This is a diagrammatic showing of valve elements of the kind that are known generally in the prior art and is included here merely for the purpose of aiding in the description of the functional chracteristic of applicant's rotary valve.

FIG. 1C is a characteristic chart showing the relationship between valve opening and torque for the prior art valve illustrated schematically in FIG. 1B.

FIG. 1D shows an alternate rotary valve design for use in the assembly of FIG. 1.

PARTICULAR DESCRIPTION OF THE INVENTION

Figure 2:
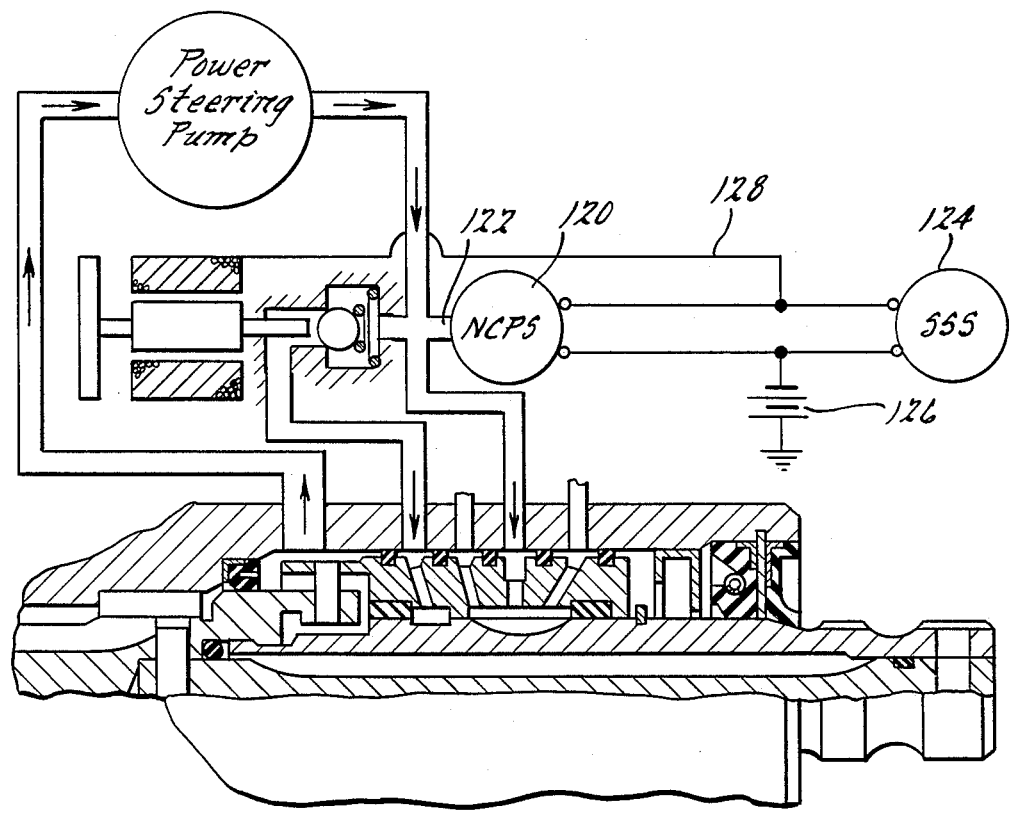
FIG. 2 is a schematic representation of an alternate valve system for use in a steering gear of the kind shown in FIG. 1.

My invention comprises a power steering gear of the kind shown in U.S. Pat. No. 4,063,490. It comprises a power steering housing 10 having a valve opening 12 within which is received a valve sleeve 14. The valve sleeve is pinned at 16 to the right hand end of a driven shaft upon which is formed a drive pinion member 18 for a power steering gear. Pinion 18 is adapted to engage a gear rack 19 for a power steering gear to which the steering gear linkage of an automotive vehicle is connected. Rack 19 is connected to a pressure movable part of a fluid motor 21.

The driven controlled steering or driving shaft 20 is connected to or formed integrally with a valve spool element 22 located within the valve sleeve 14. Valve spool element 22 is provided with a central opening 24 through which torsion bar 26 extends. Torsion bar 26 is pinned at 28 to the steering or driving shaft 20. It is pinned at the opposite end to the drive pinion member 18 by means of drive pin 30.

Sleeve 14 is provided with an inlet port 32 which communicates with pressure port 24 formed in the housing 10. Port 34 communicates with the high pressure side of the power steering pump schematically shown at 36. Communication is established between the pump and the port 34 by a pressure passage 38.

A low pressure return passage 40 communicates with the low pressure side of the pump 36. Passage 40 communicates with outlet port 42 in the housing 10. Fluid is distributed to the passage 40 from central passage 24 formed in the valve spool 22 as fluid is distributed through the radial port 46 and through the space at the left hand end of the valve opening 12, as seen in FIG. 1. Fluid seal 48 isolates the low pressure fluid in passage 40 from the region occupied by the pinion formed on the output member 18.

A right turn port 50 is located in the housing 10 on one side of the pressure passage 38 and a left turn port 52 is located in the housing 10 on the opposite side of the pressure passage 38. The ports 34, 50 and 52 are sealed, one with respect to the other, by seal rings 54 and 56. Ports 51 and 53 in valve sleeve 14 communicate with ports 50 and 52, respectively. Ports 51 and 53 in the schematic view of FIG. 4B are illustrated slightly out of axial position.

A second pressure supply passage 58 communicates with pressure port 60 which in turn communicates with feed port 62 in the valve sleeve 14. Spool valve 22 is formed with valve lands that register with port 62 as will be explained with reference to FIG. 4A. Valve spool 22 also is formed with valve lands that register with port 32 as will be explained with reference to FIG. 4B. Seal rings 64 and 66 are located on either side of the port 60 to prevent cross-over of pressurized fluid.

The right turn port 50, in addition to the seal ring 56, is sealed by a seal ring 66.

Shaft 20 is journalled in the opening 12 by bearing 68, and the opening 12 is sealed at its right hand end as seen in FIG. 1 by fluid seal 70. The left hand end of the shaft 20 is piloted by a pilot extension 72 located in an opening in the inboard end of the driven element 18. Driven element 18 in turn is rotatably supported on the housing 10 by a suitable bushing 74.

A fluid bypass valve 76 is situated between the passages 38 and 58. It normally is biased by spring 78 to a passage blocking position as shown in FIG. 1. Armature 80 of a solenoid actuator 82 is adapted to move the valve element 76 out of sealing engagement with its valve seat thereby establishing communication between the passages 38 and 58. When the solenoid 82 is de-energized, the valve is closed as seen in FIG. 1. When the actuator 82 is energized, armature 80 unseats the valve element 76.

Actuator 82 comprises a solenoid winding 84 which is adapted to be energized in response to a speed sensor when the speed of the vehicle exceeds a predetermined value. When it is actuated, both supply passages 38 and 58 are functional thereby increasing the effective valve metering area for the fluid supplied to the steering gear by the pump 36.

In order to explain the operation of the valve mechanism, reference will be made to the diagrammatic representation of the spool valve which is representative of prior art devices in FIGS. 1B and 1C. For purposes of this description a spool valve was chosen rather than a rotary valve, although the principles involved are the same.

In FIG. 1B a spool valve 86 is slidably situated in a valve sleeve or housing 88. Housing 88 has a supply pressure port 90, a right turn pressure port 92 and a left turn pressure port 94. Each of the ports 94 and 92 has an exhaust port as shown at 96 and 98, respectively.

The pressure that is developed is a function of a constant C for any particular fluid and the area A indicated by the arrow pointing to the space between the registering valve lands of the housing 88 and the spool 86 adjacent the passage 90. In FIG. 1B the symbol CA is shown for the area of the center position of the valve for the right turn port 92 only although a corresponding flow area will be present for the left turn port 94. When the valve spool 86 moves in a right hand direction, the area CA decreases and at the same time the degree of communication between the exhaust port 96 and the left turn port 94 increases. This decreases the pressure on the left turn side of the power piston and a corresponding increase in pressure occurs in the right turn side of the piston.

FIG. 1C shows a plot of the torque versus the flow metering or throttling port area between the valve lands of the valve housing 88 and the spool 86. The symbol $T_C$ equals the torque that exists when the space at the valve lands if closed. At that point the flow is zero. When the torque on the valve spool is zero, the port area is at maximum; and this symbol is represented by the legend $CA_O$. This value for area is the on-center condition that is illustrated in FIG. 1B.

The valve elements I have used in the FIG. 1 construction are not the sliding valve spool type shown in FIG. 1B, which has linear motion. Rather I have used rotary valve elements which are shown particularly in FIGS. 4A and 4B. FIG. 4B shows the valve elements that establish communication between ports 32 and 113 in FIG. 1. Inner valve element 22 is provided with six valve flats which define lands 100 and 102 as well as two other corresponding pairs of valve lands as shown. These lands, respectively, communicate with valve lands defined by valve grooves 104 and by valve grooves 106, respectively, formed in the sleeve 14.

In FIG. 4B there are 3 sets of ports each of which has the same function as the others.

Figure 4A:
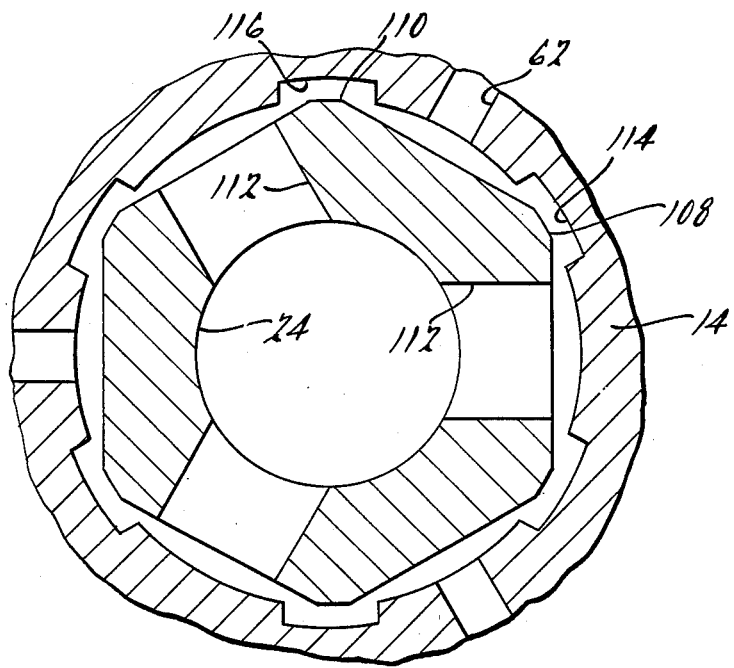
FIG. 4A is a cross-sectional schematic view as seen from the plans of section line 4A—4A of FIG. 1.
Figure 4B:
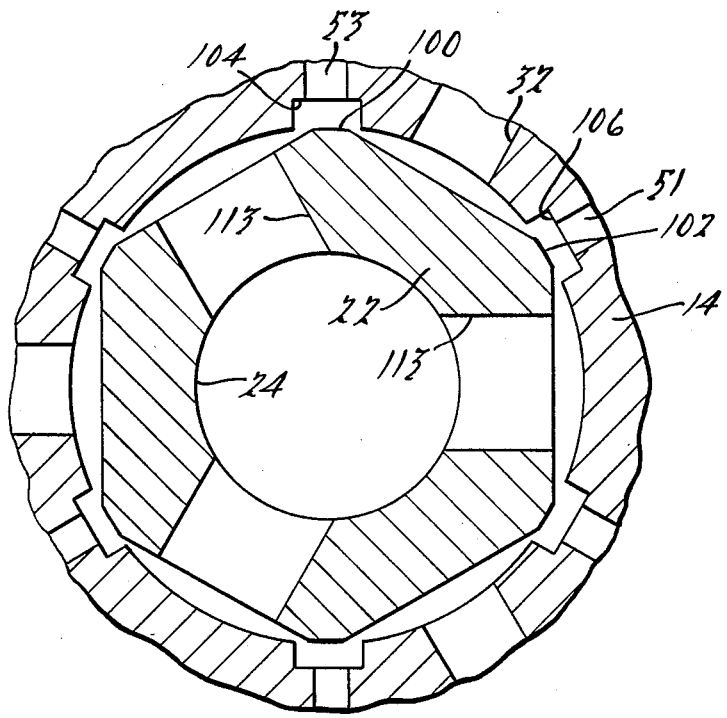
FIG. 4B is a cross-sectional schematic view as seen from the plane of section line 4B—4B of FIG. 1.
Figure 5:
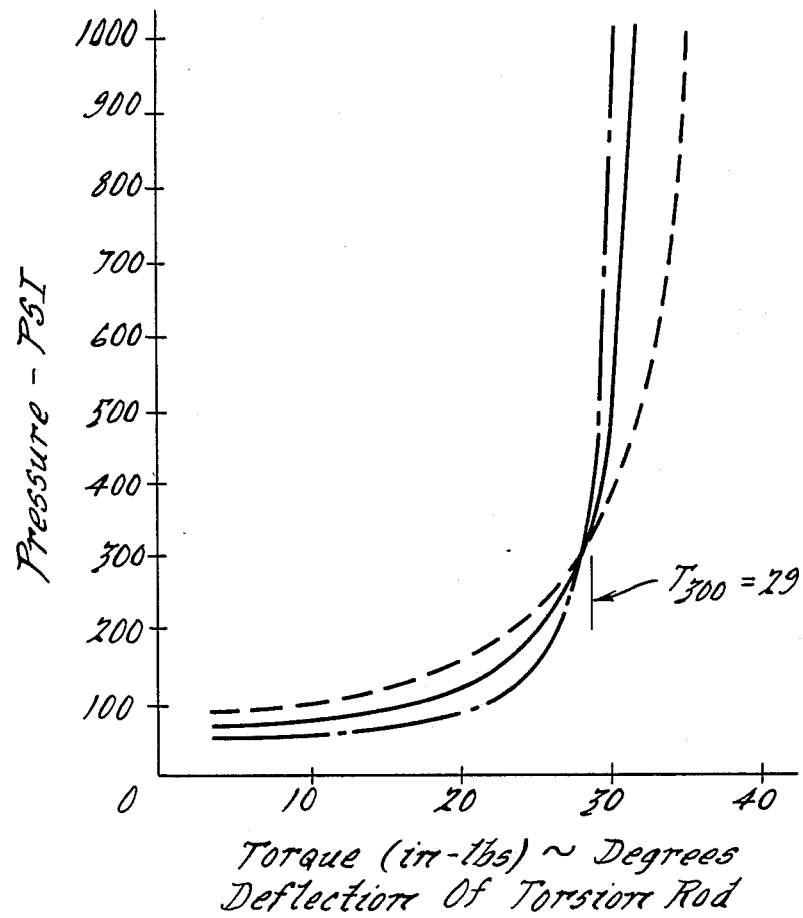
FIG. 5 is a characteritistic curve for a valve mechanism of the kind shown in FIGS. 1 and 2 wherein the effect of varying valve openings defined by the relatively movable valve elements is illustrated so that the valve opening and pressure that will result in maintenance of a desired steering torque can be illustrated. Each of the three curves corresponds to a separate valve geometry.

The valve element shown in FIGS. 4A and 4B has six pairs of flats that are machined by broaching in a direction transverse to the axis of the valve spool. This valve spool design is illustrated in FIG. 1. An alternate valve spool design is shown at FIG. 1D which would correspond to the valve spool design shown, for example, in U.S. Pat. No. 4,063,490. In this alternate valve spool design the lands are formed by a milling cutter so that when the lands are viewed in the plane that contains the axis of the valve spool, as in FIG. 1D, the lands form a crescent.

In forming the valve lands of FIG. 4B for the primary valve the broaching tool traverses the valve spool in a direction transverse to the direction of the axis of the valve element 22, and the lands for the secondary valve in FIG. 4A may be broached in the same operation at a location directly adjacent the lands for the primary valve. The secondary valve portion on the valve element 22 is formed by braoching six flats as shown in FIG. 4A. Each flat and the adjacent two flats define a land 108 and a land 110 situated on either side of a port 62. The secondary valve portion also is formed with exhaust ports 112 extending radially therethrough, and these communicate with the central passage 24 as shown in FIG. 1.

Land 108 registers with valve groove 114, and land 110 registers with valve groove 116.

Referring again to FIG. 4B, if the valve spool element 22 moves in a counterclockwise direction relative to the sleeve 14, communication between left turn port 53 and the supply port 32 increases and communication between right turn port 51 and supply port 32 decreases. This creates an increase in pressure in the left turn port and a decrease in pressure in the right turn port. At the same time the degree of communication between the right turn port 51 and the exhaust ports 113 increases and the degree of communication between left turn port 53 and the exhaust ports 113 decreases.

Upon movement of the element 22 in a clockwise direction relative to the sleeve 14, a pressure increase occurs in port 51 and a pressure decrease occurs in port 53 thus permitting a turning maneuver in a right turn direction.

At low speeds the solenoid valve element 76 is in the position shown, and the secondary rotary valve portions have not effect. The primary valve is adapted to close at a predetermined value such as 2 degrees of relative valve displacement so the torsional resistance offered by the torsion bar 26 is small for any given pressure.

Above a chose speed the solenoid is energized and the solenoid opens the valve element 76 thus coausing fluid to be directed to both the primary valve portions and the secondary valve portions. Since the secondary valve closes at a higher relative angular displacement, for example, 5 degrees, the deflection and torsional resistance of the torsion bar are greater for any given steering pressure.

The rotary valve sleeve 14 has a sealing land 118 which sealingly engages an external seal land thereby preventing an interchange of fluid between the two rotary valve portions. In the embodiment shown in FIG. 1, both the primary valve lands and the secondary valve lands can be formed with a single broaching operation with the broaching tool moveing transversely with respect to the shaft axis.

Figure 1A:
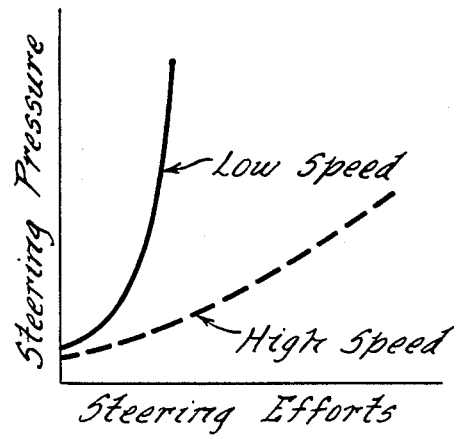
FIG. 1A is a chart that shows the relationship of steering pressure to steering torque for various vehicle speeds when the primary valve elements alone are acting (low speed) and when both the primary and the secondary valve elements are acting (high speed).

FIG. 1A shows a plot of the steering effort versus steering pressure for the two operating modes. The first plot, which is labeled "low speed", is the characteristic curve for steering pressure and steering effort while the primary valve elements only are active. The second plot, which is labeled "high speed", shows the steering pressure and steering effort relationship when both valve portions are operating. At that time the effective flow area, which is schematically indicated at $C_A$ in FIGS. 1A and 1C, is larger since the total flow area is equal to the flow area across the primary valve lands added to the flow area across the secondary valve lands. ($CA_o$ in FIGS. 1B and 1C is the value of CA.)

FIG. 2 shows the valve system illustrated in FIG. 1, but I have shown also a control circuit for the solenoid valve. It includes a normally open pressure switch 120 which is installed in the steering gear high pressure supply line. It communicates with the high pressure supply line through a branch passage 122. A speed sensor switch 124 is arranged in parallel relationship with the switch 120 to prevent a shift from one steering mode to the other, which would changes steering efforts from heavy to light, during a steering maneuver as the vehicle decelerates to a speed less than 10 miles per hour. The normally opened pressure switch 120 will prvent actuation of the solenoid circuit. During a steering maneuver with the pressure exceeding a predetermined value, for example, 100 PSI, the switch 120 will close thereby maintaining an open circuit for the solenoid valve and heavy steering efforts will result although the speed sensor switch 124 may have opened.

A shift from a light steering effort mode to a heavy effort steering mode during a steering maneuver is prevented by the pressure on the solenoid valve if the pressure exceeds a predetermined value such as 100 PSI. This pressure will prevent opening of the solenoid valve. On the other hand, a straight ahead driving pressure of 50 PSI, for example, does not prevent the opening of the solenoid valve.

In FIG. 2 the electric power source, such as the automotive vehicle battery, is shown at 126 and an electric lead extending to the solenoid windings is shown at 128. The parallel related switches 120 and 124 establish a connection between the battery and the lead 128.

Figure 3:
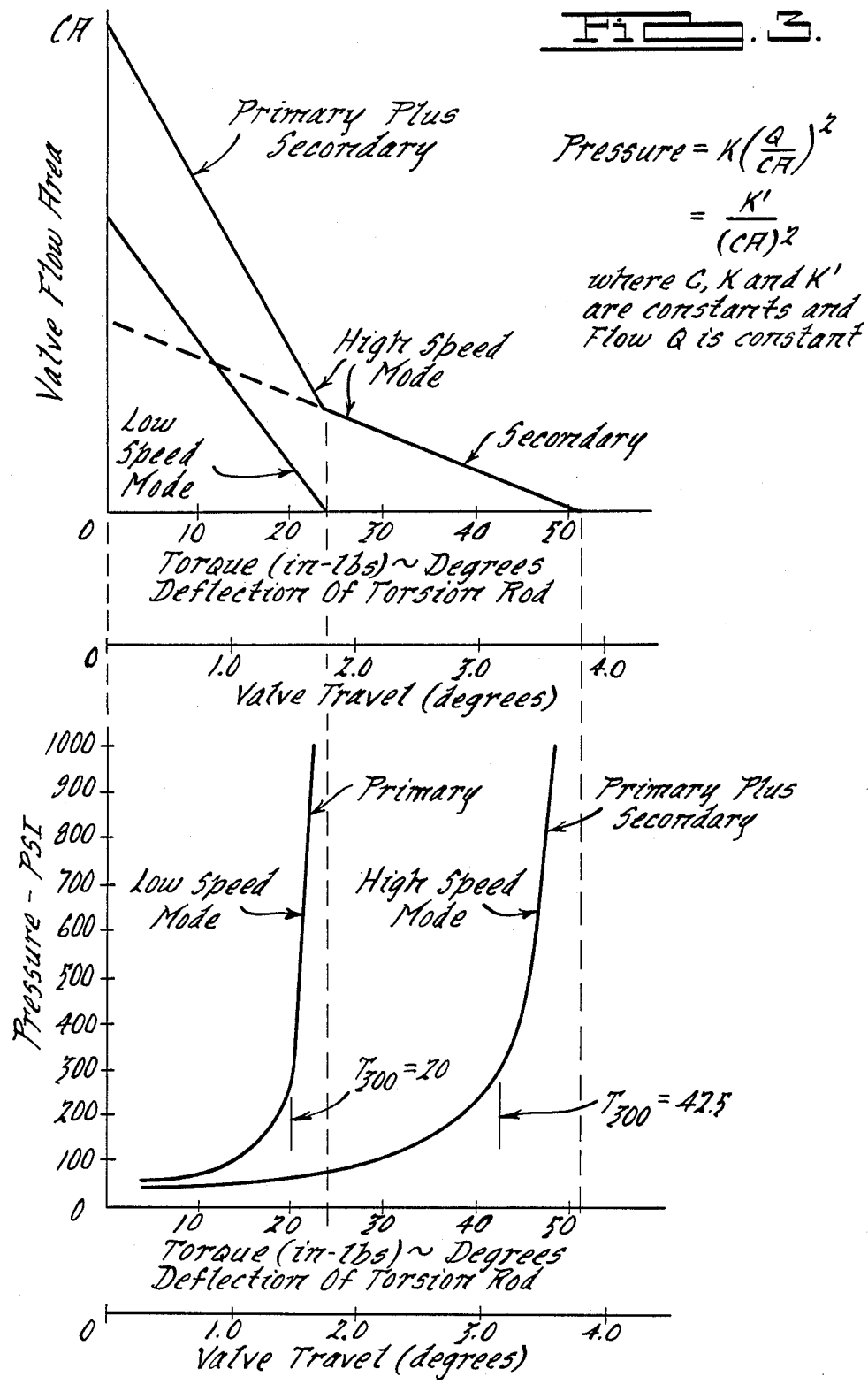
FIG. 3 is a characteristic curve showing a relationship of steering pressure to steering torque for a valve mechanism of the kind shown in FIG. 1.

In FIG. 3 I have shown the torque versus pressure relationship for a rotary valve assembly having separate primary portions and secondary portions. The primary curve shows the characteristics for the primary valve portions only. For purposes of illustration the torque that corresponds to a pressure of 300 PSI is indicated in the primary curve as 20 inch pounds. For purposes of illustration the corresponding torque corresponding to a pressure of 300 PSI pressure for the primary valve acting in cooperation with the secondary valve is 42.5.

Having described a preferred form of my invention, what I claim and desire to secure by U.S. Letters Patent is:

1. In a fluid pressure operated power steering gear mechanism having a fluid flow source, a pressure movable part adapted to be connected to a steering linkage for a vehicle, a drive member connected to said pressure movable part, a driving shaft connected to said drive member;

the connection between said drive member and said driving shaft comprising a torsion bar that accommodates angular displacement of said drive member relative to said driving shaft;

a rotary valve means situated in and partly defining pressure distribution and flow return passages extending to said pressure movable part and to said fluid flow source to effect pressure differential forces acting on said pressure movable part;

said valve means comprising an internal valve member and a surrounding sleeve;

said internal valve member having formed thereon two sets of valve lands, one set being axially displaced relative to the other, two sets of internal valve lands formed in said sleeve respectively registering with the valve land sets of said internal valve member;

said valve sleeve being connected operatively to said drive member for rotational movement therewith;

vehicle speed sensitive valve means for distributing fluid flow only to a first of said sets of valve lands at low vehicle speeds and for distributing fluid flow to both sets of said valve lands at high vehicle speeds;

said internal valve member being connected to and rotatable with said driving shaft, the first set of said registering valve lands being adapted to control pressure distribution to said pressure movable part during initial deflection of said torsion bar and being adapted to effectively increase the magnitude of the pressure distributed to said pressure movable part as said torsion bar deflection increases within a first range of deflection during operation at low vehicle speeds and the other set of registering valve lands being adapted to control pressure distribution through said passages to said pressure movable part upon deflection of said torsion bar within a greater range of deflection of said torsion bar as fluid is distributed simultaneously to both valve land sets at high vehicle speeds.

2. The combination as set forth in claim 1 wherein the first set of said registering valve lands comprises a primary valve means for effectively distributing steering pressure to said pressure movable part and increasing the magnitude of the pressure distributed to said pressure movable part upon an increase in the magnitude of the torque applied to said driving shaft and wherein the other set of registering valve lands comprises a secondary valve means for distributing pressure to said pressure movable part in parallel relationship with respect to the primary valve means thereby increasing the magnitude of the driving shaft torque required to reach a given steering pressure level when the fluid flow is distributed simultaneously to both valve lands sets at high vehicle speeds.

3. The combination as set forth in claim 2 wherein said passages include said rotary valve means and separate passage portions for supplying flow to each of said sets of registering valve lands, said passages including a fluid flow valve means for supplying fluid from said fluid flow source to said second valve land set, and vehicle speed responsive means for actuating said fluid flow valve means to effect flow to both valve land sets when the vehicle speed exceeds a predetermined value.

4. The combination as set forth in claim 3 wherein said fluid flow valve means comprises a valve element that is adapted to prevent flow from said fluid flow source to one passage portion and a solenoid actuator comprising a solenoid armature adapted to engage said valve element when it is moved in one direction thereby permitting flow to occur from said fluid flow source to both passage portions, and solenoid windings for effecting shifting movement of said armature in one direction or the other as the windings become energized and de-energized.

5. The combination as set forth in claim 1 wherein said passages include said rotary valve means and separate passage portions for supplying flow to each of said sets of registering valve lands, said passages including a fluid flow valve means for supplying fluid from said fluid flow source to said second valve land set, and vehicle speed responsive means for actuating said fluid flow valve means to effect flow to both valve land sets when the vehicle speed exceeds a predetermined value.

6. The combination as set forth in claim 5 wherein said fluid flow valve means comprises a valve element that is adapted to prevent flow from said fluid flow source to one passage portion and a solenoid actuator comprising a solenoid armature adapted to engage said valve element when it is moved in one direction thereby permitting flow to occur from said fluid flow source to both passage portions, and solenoid windings for effecting shifting movement of said armature in one direction or the other as the windings become energized and de-energized.

7. In a fluid pressure operated power steering gear mechanism having a fluid flow source, a pressure movable part adapted to be connected to a steering linkage for a vehicle, a drive member connected to said pressure movable part, a driving shaft connected to said drive member;

the connection between said drive member and said driving shaft comprising a torsion member that accommodates angular displacement of said drive member relative to said driving shaft;

a valve means situated in and partly defining pressure distribution and flow return passages extending to said pressure movable part and to said fluid flow source to effect pressure differential forces acting on said pressure movable part;

said valve means comprising an internal valve member and a surrounding sleeve;

said internal valve member having formed thereon two sets of valve lands, two sets of internal valve lands formed in said sleeve respectively registering with the valve land sets of said internal valve member;

said valve sleeve being connected operatively to said drive member for movement therewith;

vehicle speed sensitive valve means for distributing fluid flow only to a first pair of said registering valve lands at low vehicle speeds and for distributing fluid flow to both pairs of said registering valve lands at high vehicle speeds;

said internal valve member being connected to and rotatable with said driving shaft, the first set of said registering valve lands being adapted to control pressure distribution to said pressure movable part during initial deflection of said torsion member and being adapted to effectively increase the magnitude of the pressure distributed to said pressure movable part as the torsion member deflection increases within a first range of deflection during operation at low vehicle speeds and the other set of registering valve lands being adapted to control pressure distribution through said passages to said pressure movable part upon deflection of said torsion member within a greater range of deflection of said torsion member as fluid is distributed simultaneously to both valve land sets at high vehicle speeds.

8. The combination as set forth in claim 7 wherein the first set of said registering valve lands comprises a primary valve means for effectively distributing steering pressure to said pressure movable part and increasing the magnitude of the pressure distributed to said pressure movable part upon an increase in the magnitude of the torque applied to said driving shaft and wherein the other set of registering valve lands comprises a secondary valve means for distributing pressure to said pressure movable part in parallel relationship with respect to the primary valve means thereby increasing the magnitude of the driving shaft torque required to reach a given steering pressure level when the fluid flow is distributed simultaneously to both valve lands sets at high vehicle speeds.

9. The combination as set forth in claim 8 wherein said passages include said valve means and separate passage portions for supplying flow to each of said sets of registering valve lands, said passages including a fluid flow valve means for supplying fluid from said fluid flow source to said second valve land set, and vehicle speed responsive means for actuating said fluid flow valve means to effect flow to both valve land sets when the vehicle speed exceeds a predetermined value.

10. The combination as set forth in claim 9 wherein said fluid flow valve means comprises a valve element that is adapted to prevent flow from said fluid flow source to one passage portion and a solenoid actuator comprising a solenoid armature adapted to engage said valve element when it is moved in one direction thereby permitting flow to occur from said fluid flow source to both passage portions, and solenoid windings for effecting shifting movement of said armature in one direction or the other as the windings become energized and de-energized.

11. The combination as set forth in claim 7 wherein said passages include said valve means and separate passage portions for supplying flow to each of said sets of registering valve lands, said passages including a fluid flow valve means for supplying fluid from said fluid flow source to said second valve land set, and vehicle speed responsive means for actuating said fluid flow valve means to effect flow to both valve land sets when the vehicle speed exceeds a predetermined value.

12. The combination as set forth in claim 11 wherein said fluid flow valve means comprises a valve element that is adapted to prevent flow from said fluid flow source to one passage portion and a solenoid actuator comprising a solenoid armature adapted to engage said valve element when it is moved in one direction thereby permitting flow to occur from said fluid flow source to both passage portions, and solenoid windings for effecting shifting movement of said armature in one direction or the other as the windings become energized and de-energized.

13. In a fluid pressure operated power steering gear mechanism having a fluid flow source, a pressure movable part adapted to be connected to a steering linkage for a vehicle, a drive member connected to said pressure movable part, a driving shaft connected to said drive member;

the connection between said drive member and said driving shaft comprising a torsion member that accommodates angular displacement of said drive member relative to said driving shaft;

a valve means situated in and partly defining pressure distribution and exhaust passages extending to said pressure movable part and to said fluid flow source to effect pressure differential forces acting on said pressure movable part;

said valve means comprising an internal valve member and a surrounding sleeve;

said internal valve member and said sleeve having registering valve lands that define a valve fluid flow metering area;

said valve sleeve being connected operatively to said drive member for movement therewith;

vehicle speed sensitive valve means for changing the effective fluid flow area of said registering valve lands whereby the flow metering area at high speeds is greater than the flow metering area at low speeds;

said internal valve member being connected to and rotatable with said driving shaft, said registering valve lands being relatively displaced to change the flow metering area defined thereby in proportion to the torque applied to said torsion member and adapted to effectively increase the magnitude of the pressure distributed to said pressure movable part as said torsion member deflection increases within a first range of deflection during operation at low vehicle speeds and to effectively increase the magnitude of the pressure distributed to said pressure movable part as said torsion member deflection increases within a second range of deflection during operation at high vehicle speeds whereby for any given steering pressure, the second range of deflection is greater than the first range.

14. In a fluid pressure operated power steering gear mechanism having a fluid flow source, a pressure movable part adapted to be connected to a steering linkage for a vehicle, a drive member connected to said pressure movable part, a driving shaft connected to said drive member;

the connection between said drive member and said driving shaft comprising a torsion member that accommodates angular displacement of said drive member relative to said driving shaft;

a valve means situated in and partly defining pressure distribution and exhaust passages extending to said pressure movable part and to said fluid flow source to effect pressure differential forces acting on said pressure movable part;

said valve means comprising an internal valve member and a surrounding sleeve valve member, said valve members having registering valve lands that define a valve fluid flow metering area;

one valve member being connected operatively to said drive member for movement therewith; the other valve member being connected operatively to said driving shaft;

vehicle speed sensitive valve means for changing the effective fluid flow metering area of said registering valve lands whereby the flow metering area at high speeds is greater than the flow metering area at low speeds;

said registering valve lands being relatively displaced to change the flow metering area defined thereby in proportion to the torque applied to said torsion member and adapted to effectively increase the magnitude of the pressure distributed to said pressure movable part as said torsion member deflection increases within a first range of deflection during operation at low vehicle speeds and to effectively increase the magnitude of the pressure distributed to said pressure movable part as said torsion member deflection increases within a second range of deflection during operation at high vehicle speeds whereby for any given steering pressure the second range of deflection is greater than the first range.

15. In a fluid pressure operated power steering gear mechanism having a fluid flow source, a pressure movable part adapted to be connected to a steering linkage for a vehicle, a drive member connected to said pressure movable part, a driving shaft connected to said drive member;

a steering valve means situated in and partly defining pressure distribution and flow return passages extending to said pressure movable part and to said fluid flow source to effect pressure differential forces acting on said pressure movable part;

said valve means comprising an internal valve member and a surrounding valve sleeve member;

the connection between said drive member and said driving shaft comprising a valve member centering spring that accommodates angular displacement of said drive member relative to said driving shaft;

said internal valve member having formed thereon two sets of valve lands, two sets of internal valve lands formed in said sleeve member respectively registering with the valve land sets of said internal valve member;

said valve sleeve member being connected drivably to said drive member;

vehicle speed sensitive valve means for distributing fluid flow only to a first pair of said registering valve lands at low vehicle speeds and for distributing fluid flow to both pairs of said registering valve lands at high vehicle speeds;

said internal valve member being connected to and rotatable with said driving shaft, the first pair of registering valve lands being adapted to control pressure distribution to said pressure movable part during initial deflection of said centering spring and being adapted to increase the magnitude of the pressure distributed to said pressure movable part as the centering spring deflection increases within a first range of deflection during operation at low vehicle speeds and the other pair of registering valve lands being adapted to control pressure distribution through said passages to said pressure movable part upon deflection of said centering spring within a greater range of deflection of said centering spring as fluid is distributed simultaneously to both valve land pairs at high vehicle speeds.

16. In a fluid pressure operated power steering gear mechanism having a fluid flow source, a pressure movable part adapted to be connected to a steering linkage for a vehicle, a drive member connected to said pressure movable part, a driving shaft connected to said drive member;

a steering valve means situated in and partly defining pressure distribution and flow return passages extending to said pressure movable part and to said fluid flow source to effect pressure differential forces acting on said pressure movable part;

said valve means comprising an internal valve member and a surrounding valve sleeve member;

the connection between said drive member and said driving shaft comprising a valve member centering spring that accommodates angular displacement of said drive member relative to said driving shaft;

said internal valve member having formed thereon two sets of valve lands, two sets of internal valve lands formed in said sleeve member respectively registering with the valve land sets of said internal valve member;

one of said valve members being connected drivably to said drive member;

vehicle speed sensitive valve means for distributing fluid flow only to a first pair of said registering valve lands at low vehicle speeds and for distributing fluid flow to both pairs of said registering valve lands at high vehicle speeds;

the other of said valve members being connected drivably to and actuated by said driving shaft, the first pair of registering valve lands being adapted to control pressure distribution to said pressure movable part during initial deflection of said centering spring and being adapted to increase the magnitude of the pressure distributed to said pressure movable part as the centering spring deflection increases within a first range of deflection during operation at low vehicle speeds and the other pair of registering valve lands being adapted to control pressure distribution through said passages to said pressure movable part upon deflection of said centering spring within a greater range of deflection of said centering spring as fluid is distributed simultaneously to both valve land pairs at high vehicle speeds.

17. In a fluid pressure operated power steering gear mechanism having a fluid flow source, a pressure movable part adapted to be connected to a steering linkage for a vehicle, a drive member connected to said pressure movable part, a driving shaft connected to said drive member;

a steering valve means situated in and partly defining a flow throttling fluid flow area that forms a part of pressure distribution and flow return passages extending to said pressure movable part and to said fluid flow source to effect pressure differential forces acting on said pressure movable part;

said valve means comprising an internal valve member and a surrounding valve sleeve member;

the connection between said drive member and said driving shaft comprising a valve member centering spring that accommodates angular displacement of said drive member relative to said driving shaft;

said internal valve member having valve lands formed thereon two sets of internal valve lands formed in said sleeve respectively registering with the valve lands of said internal valve member;

one of said said valve members being connected drivably to said drive member;

vehicle speed sensitive valve means for increasing the effective fluid flow throttling area for said steering valve means when the vehicle speed increases;

the other of said valve members being connected drivably to and actuated by said driving shaft, the registering valve lands being adapted to control pressure distribution to said pressure movable part during initial deflection of said centering spring and being adapted to increase the magnitude of the pressure distributed to said pressure movable part as the centering spring deflection increases within a first range of deflection, during operation at low vehicle speeds and the other pair of registering valve lands being adapted to control pressure distribution through said passages to said pressure movable part upon deflection of said centering spring within a greater range of deflection of said centering spring as fluid is distributed through an increased valve throttling area at high vehicle speeds.

* * * * *